United States Patent
Tang (10) Patent No.: US 10,524,132 B2
(45) Date of Patent: Dec. 31, 2019

(54) METHOD FOR INTRA-CELL FREQUENCY REUSE FOR INDOOR WIRELESS NETWORK AND BASEBAND UNIT

(71) Applicant: Alcatel Lucent, Boulogne Billancourt (FR)

(72) Inventor: Yanbo Tang, Shanghai (CN)

(73) Assignee: ALCATEL LUCENT, Nozay (FR)

(*) Notice: Subject to any disclaimer, the term of this patent is extended or adjusted under 35 U.S.C. 154(b) by 0 days.

(21) Appl. No.: 15/554,776

(22) PCT Filed: Mar. 1, 2016

(86) PCT No.: PCT/IB2016/000349
§ 371 (c)(1),
(2) Date: Aug. 31, 2017

(87) PCT Pub. No.: WO2016/139537
PCT Pub. Date: Sep. 9, 2016

(65) Prior Publication Data
US 2018/0242158 A1   Aug. 23, 2018

(30) Foreign Application Priority Data

Mar. 4, 2015 (CN) .......................... 2015 1 0095288

(51) Int. Cl.
*H04W 72/04* (2009.01)
*H04W 16/02* (2009.01)
(Continued)

(52) U.S. Cl.
CPC ............ *H04W 16/02* (2013.01); *H04B 7/022* (2013.01); *H04W 16/28* (2013.01); *H04W 52/34* (2013.01);
(Continued)

(58) Field of Classification Search
CPC .... H04B 7/2121; H04B 7/2123; H04B 7/022; H04J 2203/0069; H04Q 2213/394;
(Continued)

(56) References Cited

U.S. PATENT DOCUMENTS

2011/0190005 A1* 8/2011 Cheon ................... H04W 24/00
455/456.1
2012/0213109 A1* 8/2012 Xu ......................... H04B 7/024
370/252
(Continued)

FOREIGN PATENT DOCUMENTS

CN      1625079 A      6/2005
CN    101562818 A     10/2009
(Continued)

OTHER PUBLICATIONS

Wang Kaiwei et al., "Graph-based dynamic frequency reuse in Cloud-RAN," IEEE Wireless Communications and Networking Conference, pp. 105-110, XP032682984, 2014.
(Continued)

Primary Examiner — Robert J Lopata
(74) Attorney, Agent, or Firm — Fay Sharpe LLP (57) ABSTRACT

The present disclosure provides a method for intra-cell frequency reuse for an indoor wireless network and a baseband unit. The method includes: at the BBU, establishing a coverage relationship between one or more mRRHs and multiple UEs (510); determining a correspondence relationship between UEs and beam directions covered by each mRRH of the one or more mRRHs (520); determining a location distribution of the multiple UEs based on the coverage relationship between the mRRHs and the UEs and the correspondence relationship between the UEs and the beam directions covered by the mRRH (530); and perform-
(Continued)

ing a power allocation for each mRRH based on the location distribution of the multiple UEs (540).

12 Claims, 6 Drawing Sheets

(51) Int. Cl.
  *H04B 7/022* (2017.01)
  *H04W 52/34* (2009.01)
  *H04W 16/28* (2009.01)
  *H04W 88/08* (2009.01)
(52) U.S. Cl.
  CPC ...... *H04W 72/0473* (2013.01); *H04W 88/085* (2013.01)
(58) Field of Classification Search
  CPC ..... H04W 72/04; H04W 72/12; H04W 76/00; H04W 16/02; H04W 52/34; H04W 72/0473; H04W 88/085
  USPC .......................................................... 370/329
  See application file for complete search history.

(56) References Cited

U.S. PATENT DOCUMENTS

| | | | | |
|---|---|---|---|---|
| 2012/0281555 | A1* | 11/2012 | Gao | H04L 5/0051 370/252 |
| 2013/0336224 | A1* | 12/2013 | Davydov | H04W 4/70 370/328 |
| 2014/0031049 | A1 | 1/2014 | Sundaresan et al. | |
| 2014/0086155 | A1* | 3/2014 | Chen | H04B 7/0626 370/329 |
| 2014/0269605 | A1* | 9/2014 | Pecen | H04W 56/00 370/330 |
| 2014/0274160 | A1* | 9/2014 | Xiao | H04W 64/00 455/456.5 |
| 2015/0326296 | A1* | 11/2015 | Thiele | H04B 7/024 370/328 |
| 2017/0059717 | A1* | 3/2017 | Polehn | G01S 19/48 |
| 2017/0245102 | A1* | 8/2017 | Lopez | G01S 5/0252 |
| 2017/0257155 | A1* | 9/2017 | Liang | H04B 7/0695 |
| 2017/0265085 | A1* | 9/2017 | Xiao | H04W 72/04 |
| 2017/0311379 | A1* | 10/2017 | Trojer | H04W 8/00 |
| 2018/0007562 | A1* | 1/2018 | Auer | H04W 16/32 |
| 2018/0035314 | A1* | 2/2018 | Auer | H04W 24/02 |
| 2018/0206144 | A1* | 7/2018 | Jiang | H04W 4/023 |

FOREIGN PATENT DOCUMENTS

| | | |
|---|---|---|
| CN | 102595432 A | 7/2012 |
| CN | 102970067 A | 3/2013 |
| KR | 2011-0045936 A | 5/2011 |
| KR | 2014-0073677 A | 6/2014 |

OTHER PUBLICATIONS

International Search Report for PCT/IB2016/000349 dated Jun. 13, 2016.

* cited by examiner

METHOD FOR INTRA-CELL FREQUENCY REUSE FOR INDOOR WIRELESS NETWORK AND BASEBAND UNIT

TECHNICAL FIELD

The present disclosure generally relates to the field of wireless communication, and more particularly to a method for intra-cell frequency reuse for an indoor wireless network and a baseband unit for implementing the method.

BACKGROUND OF THE INVENTION

As the increasing of indoor traffic, indoor coverage will become more and more important for wireless networks. One of the most effective indoor coverage solutions is Distributed Antenna System (DAS). DAS can improve frequency efficiency and enhance system capacity. Since it closes the distance between an User Equipment (UE) and the antenna, DAS can also decrease UE battery power consumption. Currently, some indoor coverage systems adopt fiber-based digital DAS. This kind of DAS is constructed with optical fiber and distributed Remote Radio Heads (RRHs). A RRH may realize all RF front-end functions. The digital baseband signals (I/Q data) are transmitted between the RRH and a base station. Two standardized interfaces, e.g. Open Base Station Architecture (OBSAI) and Common Public Radio Interface (CPRI) protocols can be used for the communication between the base station and its RRHs.

Figure 1:
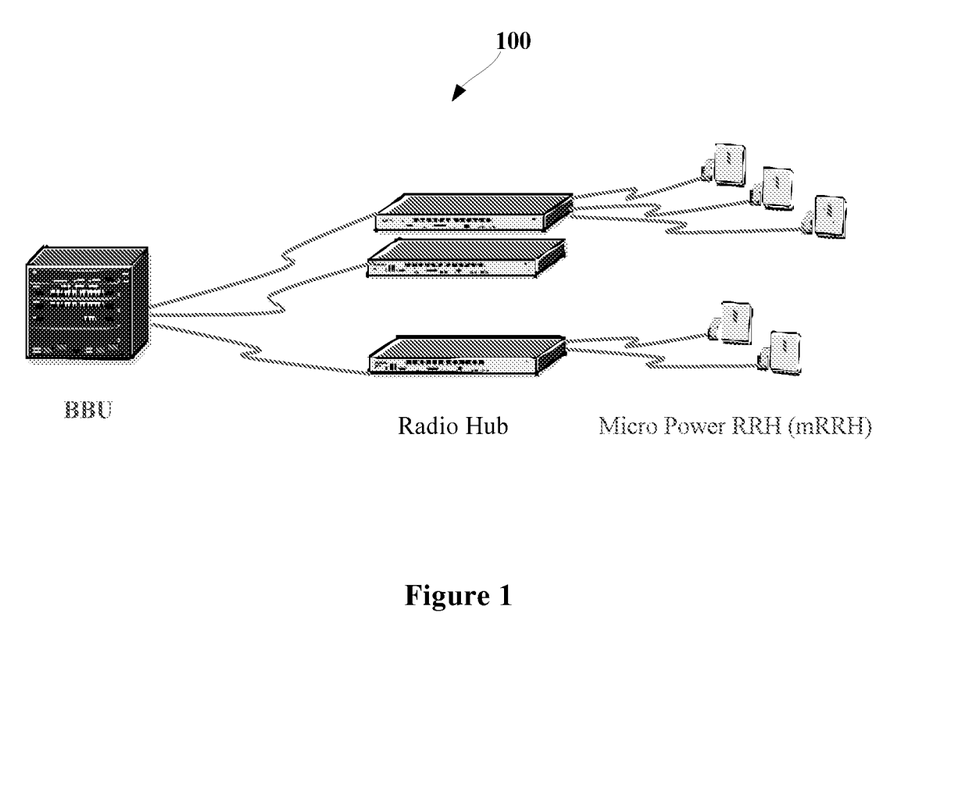
FIG. 1 is a schematic diagram of the basic architecture of a smart digital indoor coverage system.

FIG. 1 is a schematic diagram of the basic architecture of a smart digital indoor coverage system. As shown in FIG. 1, the digital indoor coverage system 100 includes a Base Band Unit (BBU), some micro power RRHs (mRRHs) and one or more radio hubs connecting the BBU and the mRRHs. The mRRHs usually have low power, for example, about 100 mW, and their distribution density is high. Whether all mRRHs belong to one cell depends on the user requirement, for example, it depends on whether there is only one cell in a building much of the day. Sometimes, it needs to do the cell split, which means splitting one cell into two or more cells according to different requirements. The radio hub is the routing center. In the BBU, the radio signals from multiple mRRHs are combined to form an uplink signal, while the downlink signals from baseband are distributed to mRRHs.

Ericsson's DOT system and HUAWEI's Lampsite system use Ethernet cable to replace the radio frequency cable for digital signal transmission, and at the remote side, the passive antennas are replaced by mRRHs, and the architecture is almost the same as the one shown in FIG. 1.

In general, outdoor coverage faces relatively open environment, while indoor coverage faces a more complexity and closed environment. A cell's service area often consists of several isolated blocks as separation of concrete wall and floor in the building. In this kind of indoor coverage, it is possible that some UEs in the same cell are isolated enough and they are separated by multiple concrete walls and floors and served by different mRRHs. As the inherent nature of indoor coverage, it is possible to find out a group of UEs in which all UEs are isolated each other such that all UEs in the group can work in the same frequency without any interference, therefore frequency reuse in this kind of group is feasible and system capacity will be improved apparently. Here, this reuse is called as intra-cell frequency reuse due to all resource belonging to one single cell.

For inter-cell frequency reuse, two representative Inter-Cell Interference Coordination (ICIC) techniques are Fractional Frequency Reuse (FFR) and Soft Frequency Reuse (SFR). Both methods split a cell into cell center zone and cell edge zone. In FFR, the frequency spectrum is also divided into two parts: the center band and the edge band. The center band may be used by all cell center users with a reuse factor of one. The edge band may be further partitioned into several sub-bands and reused by cell edge users with a relatively high reuse factor. In SFR, the whole frequency spectrum will be divided into several sub-bands, and one of them will be allocated to cell edge users and the rest of the sub-bands will be used by cell center users with a relatively low power.

Apparently, FFR and SFR solutions do not take full advantage of the isolation and beam accumulation nature of indoor environment, thereby they are more suitable for inter-cell frequency reuse and not particularly suitable for intra-cell frequency reuse.

SUMMARY OF THE INVENTION

In view of this, the present disclosure provides a solution for intra-cell frequency reuse for an indoor wireless network, and the solution takes full consideration of the isolation nature of the indoor wireless network and the aggregation nature of UEs.

According to the first aspect of the present disclosure, there is provided a method for intra-cell frequency reuse for an indoor wireless network, wherein the indoor wireless network includes a Base Band Unit (BBU), one or more micro power Remote Radio Heads (mRRHs) and radio hubs connecting the BBU and the mRRHs; the indoor wireless network belongs to a same cell that serves multiple User Equipments (UEs), the method including: at the BBU, establishing a coverage relationship between the one or more mRRHs and the multiple UEs; determining a correspondence relationship between UEs and beam directions covered by each mRRH of the one or more mRRHs; determining a location distribution of the multiple UEs based on the coverage relationship between the mRRHs and the UEs and the correspondence relationship between the UEs and the beam directions covered by the mRRH; and performing a power allocation for each mRRH based on the location distribution of the multiple UEs.

According to the second aspect of the present disclosure, there is provided a Base Band Unit (BBU) for intra-cell frequency reuse for an indoor wireless network, wherein the indoor wireless network includes the BBU, one or more micro power Remote Radio Heads (mRRHs) and radio hubs connecting the BBU and the mRRHs; the indoor wireless network belongs to a same cell that serves multiple User Equipments (UEs), the BBU including: a coverage relationship establishing unit configured to establish a coverage relationship between the one or more mRRHs and the multiple UEs; a correspondence relationship determining unit, configured to determine a correspondence relationship between UEs and beam directions covered by each mRRH of the one or more mRRHs; a location distribution determining unit, configured to determine a location distribution of the multiple UEs based on the coverage relationship between the mRRHs and the UEs and the correspondence relationship between the UEs and the beam directions covered by the mRRH; and a power allocating unit configured to perform a power allocation for each mRRH based on the location distribution of the multiple UEs.

With the solution of the present disclosure improves the capacity and spectrum efficiency of the indoor wireless system and realizes intra-cell frequency reuse between the mutual interfered UE groups.

BRIEF DESCRIPTION OF THE DRAWINGS

The present disclosure will be understood better by making references to the following description of the specific embodiments in conjunction with the accompanying drawings, and other objects, details, features and advantages of the present disclosure will become more obvious. In the accompanying drawings.

Here, in all figures, same or similar signs indicate same, similar or corresponding features or functions.

DESCRIPTION OF PREFERRED
EMBODIMENTS

Preferred embodiments of the present disclosure will be described below in detail with reference to the figures. Although the preferred embodiments of the present disclosure have been shown in the figures, it should be understood that the present disclosure can be implemented in various forms, rather than being limited by embodiments described here. On the contrary, providing these embodiments is to make the present disclosure more thorough and complete, and can convey the scope of the present disclosure completely to those skilled in the art.

As described above, for some indoor wireless network environments, a cell may cover a complexity area with several RRHs. Two or more UEs in different RRH coverage areas may be fully isolated, and thus it is possible to find a group of UEs that are fully isolated from each other and can reuse the same frequency resource without generating any interference. The UE grouping information may be provided to a system scheduler so as to allocate system resources to the group of isolated UEs.

Figure 2:
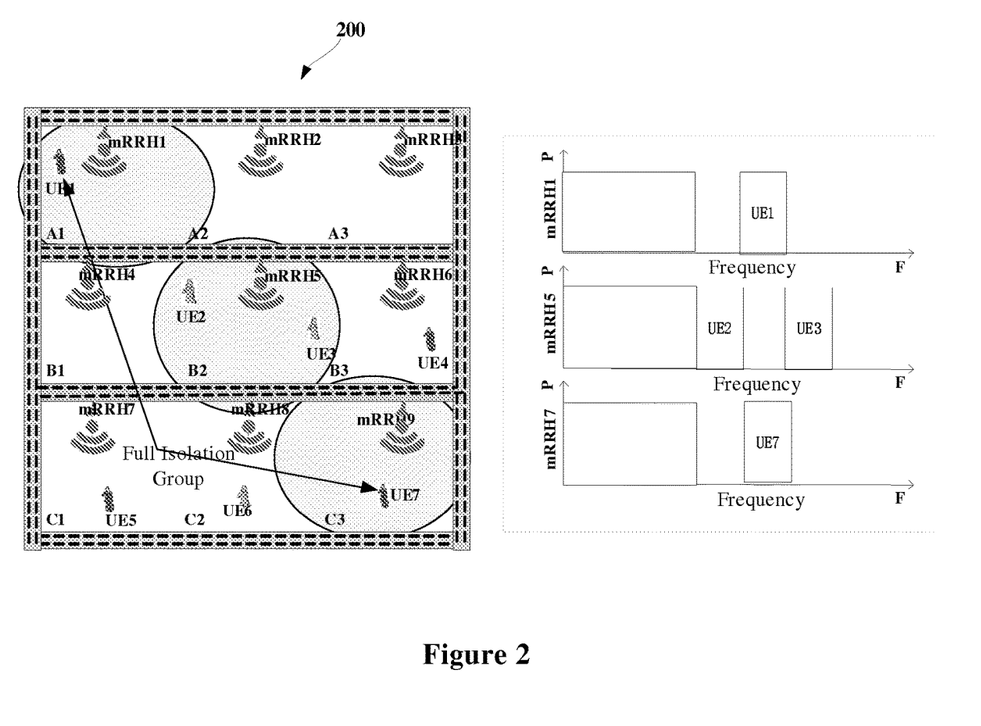
FIG. 2 is a schematic diagram of the basic principle of a full isolation solution in an indoor wireless network.

FIG. 2 is a schematic diagram of the basic principle of a full isolation solution in an indoor wireless network 200. As shown in FIG. 2, in the indoor wireless network 200, the floors F1, F2 and F3 of a building are under the coverage of the same cell; each floor has three corresponding rooms A1-A3, B1-B3 and C1-C3, respectively; each room has one corresponding mRRH to provide service for the UEs in the room. Thus, the cell has 9 mRRHs to cover the whole building. As shown in FIG. 2, for example, UE1 and UE7 are separated by several floors and walls, and they can construct a maximum isolated group capable of reusing the same frequency resource. Thus, in such a full isolation solution, radio signals of mRRH1 providing service for UE1 and mRRH9 providing service for UE7 may be separately processed in the baseband unit, and radio signals of all the other mRRHs are still processed together.

However, this solution only can be used in a full isolation situation, while in the actual situation, most of the near UEs have mutual interference.

In addition, for the smart digital indoor coverage system as shown in FIG. 1, there are two scenarios for antenna configuration as below:

(1) Each mRRH is equipped with several antennas, and each antenna denotes one Radio Frequency (RF) channel so as to generate different beams in different directions.

(2) Each mRRH is equipped with only one RF channel, and this RF channel connects several directional antennas. For this scenario, the mRRH should further include a switch unit, for example, a smart switch to switch on/off these directional antennas.

However, in the current frequency reuse solution for indoor wireless coverage, no beam/antenna direction is taken into consideration.

In view of the above, the present disclosure provides a solution of maximizing the frequency utilization of an indoor wireless network in considering the beam/antenna directivity, and the solution is not limited to the fully isolated UE group but can be applied to the mutually interfered UEs.

The solution of the present disclosure will be described below mainly in combination with scenario 2, but it can be understood by those skilled in the art that the solution for scenario 2 can be slightly changed so as to be applied to scenario 1.

Figure 3:
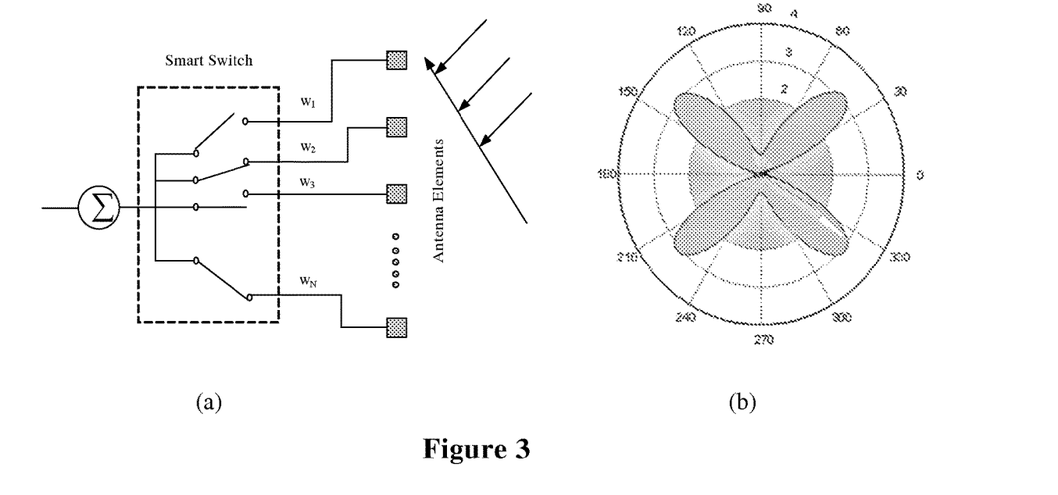
FIG. 3 shows a schematic diagram of the architecture of an antenna system including directional antennas.

Firstly, an introduction is made to the directional antenna and the smart switch. Normally, an omnidirectional antenna may be used in an indoor network to improve the indoor throughput and reduce mutual interference between UEs, but in some indoor scenarios, directional antennas have already been deployed. FIG. 3 shows a schematic diagram of the architecture of an antenna system including directional antennas. The antenna system as shown in FIG. 3 is integrated with one omni-directional antenna and other surrounding directional antennas. Herein, the omni-directional antenna is responsible for basic coverage of the whole room and the combination of all directional antennas can cover the 360 degree angle to get a better quality of service as shown in FIG. 3(b). Specifically, FIG. 3(a) shows a smart switch located at the mRRH side, and this smart switch dynamically selects a subset of antenna elements (out of all M elements, selects N elements (N<=M) with predefined weights or dynamically assigned weights) according to the dynamic distribution of the users to generate different beam patterns, or it is possible to predefine a few beam patterns (element subsets, weights, etc.) and the selection is only made from these beam patterns.

Generally, UEs are not distributed averagely in the whole room. Some people may aggregate in some areas, while the others may be located in the other areas. If directional antennas are deployed in the indoor wireless network, they may point to UEs. Some of the directional antennas are allocated with larger power and some of the directional antennas are allocated with lower power, even some of the directional antennas can be power off based on UEs' distribution. From the view point of whole, since more UEs will adopt modulation and coding solutions with higher efficiency, UEs with lower power will be left with more time-frequency resource. Therefore, the UEs with low power may also obtain enough resources so that the capacity of the whole cell will be improved.

Normally, the total power of each mRRH is fixed or with little fluctuation, while the power allocation in different directional antennas is changed according to the distribution of UEs. In some directions, the allocated power is increased, while in some other directions, the allocated power is reduced. This also reduces the interference to other UEs. In this document, this characteristic is used to realize the frequency reuse between mutually interfered UEs. From this point of view, it will improve the spectrum efficiency and reduce interference to other adjacent rooms or buildings.

Figure 4:
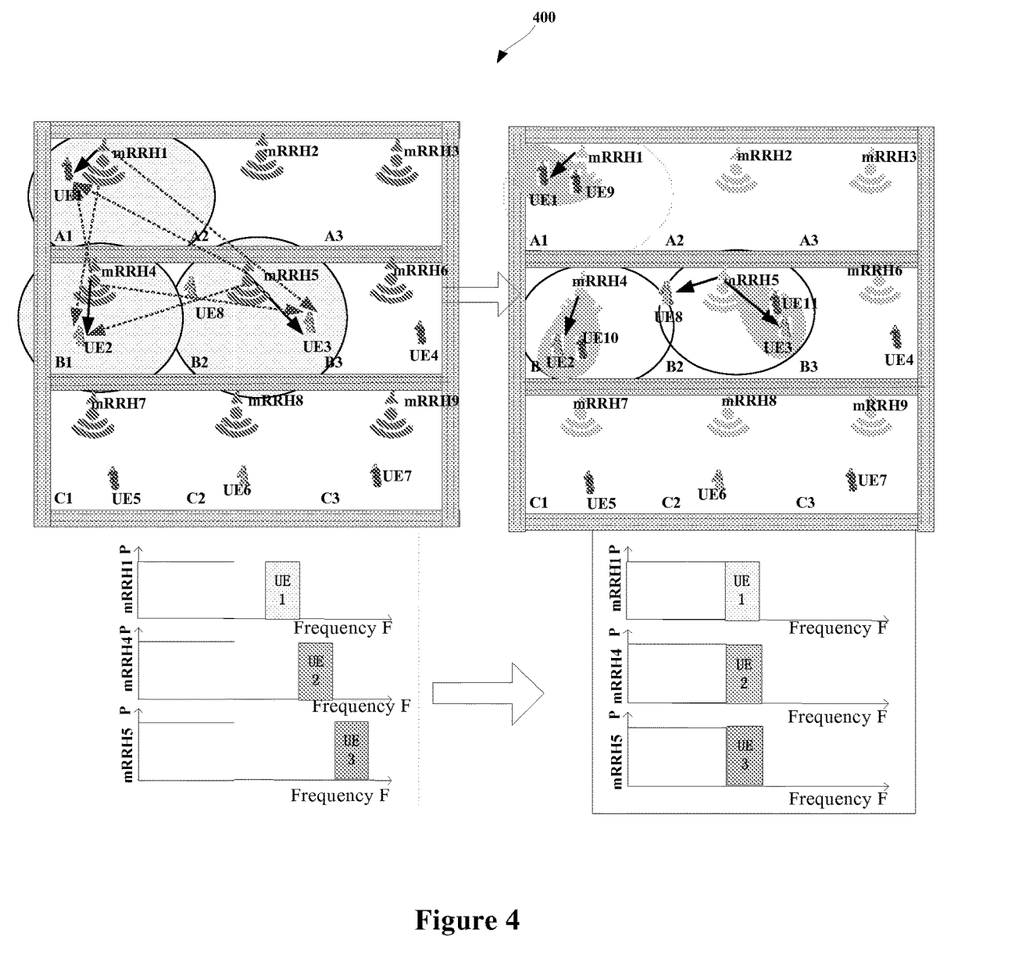
FIG. 4 shows a schematic diagram of an exemplary indoor wireless network according to embodiments of the present disclosure.

FIG. 4 shows a schematic diagram of an exemplary indoor wireless network 400 according to embodiments of the present disclosure. Similar to FIG. 1 and FIG. 2, the indoor wireless network 400 includes a BBU (not shown), one or more mRRHs (e.g., mRRH1-mRRH9) and one or more radio hubs (not shown) connecting the BBU and the mRRHs. Similar to the indoor wireless network 200, the indoor wireless network 400 belongs to a same cell that serves multiple UEs, e.g., UE1-UE9. The floors F1, F2 and F3 of the building are under the coverage of the same cell; each floor has three corresponding rooms A1-A3, B1-B3 and C1-C3, respectively; each room has one corresponding mRRH to provide service for the UEs in the room. Thus, the cell has 9 mRRHs to cover the whole building.

Figure 5:
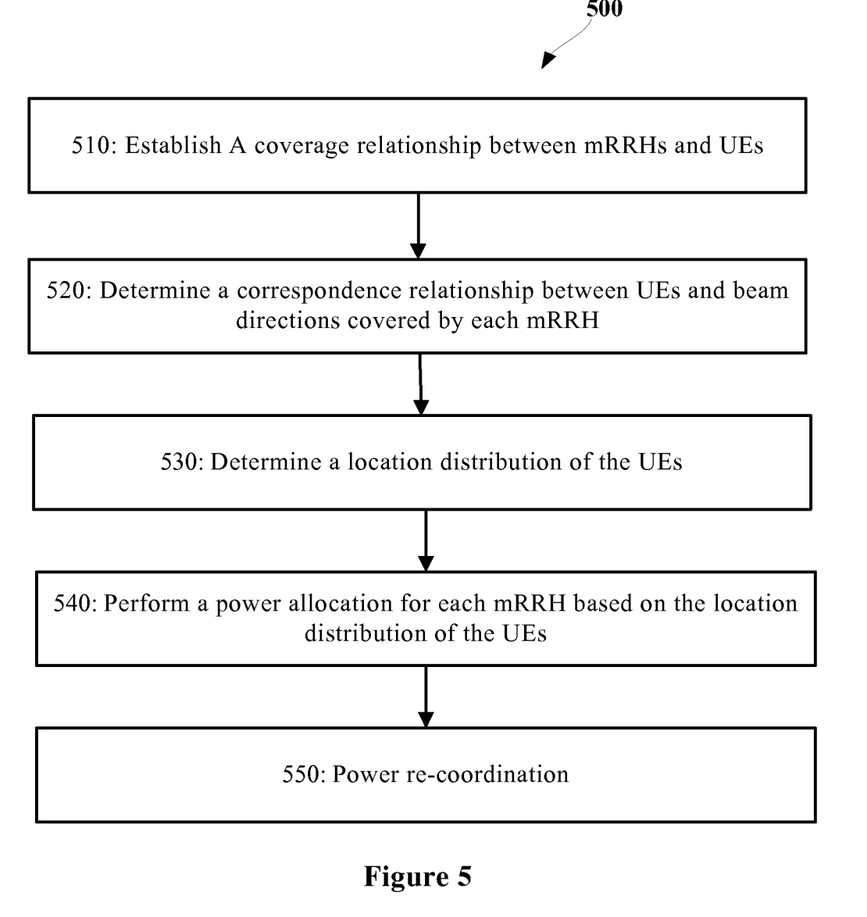
FIG. 5 shows a flowchart of a method for intra-cell frequency reuse for an indoor wireless network according to embodiments of the present disclosure.

FIG. 5 shows a flowchart of a method 500 for intra-cell frequency reuse for an indoor wireless network according to embodiments of the present disclosure. The method 500 is described below in combination with the indoor wireless network 400.

The method 500 starts in step 510, in which the BBU establishes a coverage relationship between the mRRH1-mRRH9 and the UE1-UE9 in the indoor wireless network 400.

In the present disclosure, an mRRH level discovery scheme is employed at the BBU to establish the coverage relationship between the mRRHs and the UEs by measuring the uplink signal of each mRRH.

In a specific implementation, in step 510, the BBU captures the uplink signal of each mRRH and analyzes an uplink Signal to Interference plus Noise Ratio (SINR) of each UE therein. In order to establish the coverage relationship between the mRRHs and the UEs, the present disclosure presets a Signal Noise Ratio (SNR) threshold. The BBU compares the uplink SINR of each UE with the preset SNR threshold and determines that the UE is covered by the mRRH when the uplink SINR of the UE is greater than the SNR threshold.

The coverage relationship can be denoted by a matrix C as below:

$$C = \begin{bmatrix} c_{11} & c_{12} & \cdots & c_{1l} \\ c_{21} & & & \\ & & c_{ij} & \\ c_{k1} & c_{k2} & \cdots & c_{kl} \end{bmatrix},$$

where $c_{ij}$ denotes whether the ith UE (i.e. UEi (i=1, 2, ..., k)) of the indoor wireless network 400 is located in the coverage area of the jth mRRH (j=1, 2, ..., l) or is adjacent to the jth mRRH; k and l are respectively the number of UEs and the number of mRRHs contained in the indoor wireless network 400.

In an implementation, the value of $c_{ij}$ can be 0 or 1. For example, the value of $c_{ij}$ being 1 means that the ith UE is located in the coverage area of the jth mRRH or is adjacent to the jth mRRH, while the value of $c_{ij}$ being 0 means that the ith UE is completely outside the coverage area of the jth mRRH.

For example, in the indoor wireless network 400 as shown in FIG. 4, the coverage relationship between the UE1-UE5 and the mRRH1-mRRH4 can be denoted as:

$$C = \begin{bmatrix} 1 & 0 & 0 & 1 \\ 0 & 1 & 1 & 0 \\ 0 & 0 & 1 & 0 \\ 1 & 0 & 1 & 0 \\ 0 & 0 & 1 & 1 \end{bmatrix}.$$

It can be seen that in some cases, one UE may be covered by multiple mRRHs.

A group of mutually interfered UEs can be established based on the matrix C. For example, as shown in FIG. 4, UE1, UE2 and UE3 in adjacent mRRH1, mRRH4 and mRRH5 can construct a group of mutually interfered UEs. Thus, the matrix C can be rewritten as a matrix C' to denote the group of mutually interfered UEs:

$$C' = \begin{matrix} & mRRH1 & mRRH4 & mRRH5 \\ UE1 & \begin{bmatrix} 1 & 1 & 1 \\ UE2 & 1 & 1 & 1 \\ UE3 & 1 & 1 & 1 \end{bmatrix} \end{matrix}.$$

It can be seen from the matrix C' that each of the UE1-UE3 has a coverage relationship with each of the mRRH1, mRRH4 and mRRH5 so that these UEs cannot construct a fully isolated UE group, and thus the aforesaid full isolation solution is not applicable to this situation.

As shown in FIG. 3, when the system starts, the omnidirectional antenna at the center is already powered on to ensure a good basic indoor coverage. In order to determine the coverage relationship between the mRRHs and the UEs, the surrounding directional antennas should be switched on one by one in order that the BBU can detect a UE by measuring the signal strength of uplink channels or the feedback (e.g. Reference Signal Received Power (RSRP)) from the UE. When one directional antenna is powered on, the other antennas should be powered off. During this process, the BBU can know which direction the UE is located in and how many UEs have access to an mRRH.

The serving selection relationships (i.e. the coverage relationships) between the mRRHs and the UEs are slowly variable, and thus it is enough for the mRRHs to perform periodically scanning, which can reduce implementation complexity.

In step 520, the BBU determines a correspondence relationship between the UEs and beam directions covered by each mRRH in the indoor wireless network 400.

Next, in step 530, the BBU determines a location distribution of the UE1-UE9 based on the coverage relationship between the mRRHs and the UEs established in the step 510 and the correspondence relationship between the UEs and the beam directions covered by each mRRH determined in the step 520.

In step 540, the BBU performs a power allocation for each mRRH based on the location distribution of the UE1-UE9.

In the above scenario 2 of the indoor wireless network, each mRRH is equipped with one RF channel that connects multiple directional antennas and the mRRH further includes a switch unit to switch on/off the multiple directional antennas.

Thus, in an implementation for scenario 2, the BBU divides the coverage area of each mRRH into multiple quadrants based on the number of directional antennas corresponding to each mRRH so as to determine the quadrant of the mRRH in which each UE is located.

Figure 6:
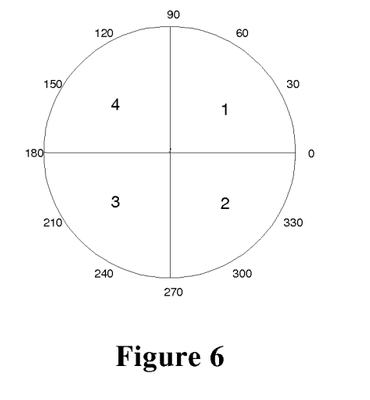
FIG. 6 shows an example of coverage division of mRRHs according to one embodiment of the present disclosure.

FIG. 6 shows an example of coverage division of mRRHs according to one embodiment of the present disclosure. As shown in FIG. 6, if it is assumed that each mRRH has 4 directional antennas and 1-4 are used to denote the first, second, third and fourth quadrants, respectively, then the correspondence relationship between each UE and the beam directions can be denoted as a matrix B below:

$$B = \begin{matrix} & mRRH1 & mRRH4 & mRRH5 \\ UE1 & 4 & 0 & 0 \\ UE2 & 0 & 3 & 0 \\ UE3 & 0 & 0 & 2 \end{matrix},$$

where the value of the element in the jth column of the ith row in the matrix B denotes the quadrant of the mRRH corresponding to the jth column in which the UE corresponding to the ith row of the matrix is located. For example, element 4 in the first column of the first row in the above matrix B denotes that the UE1 is located in the fourth quadrant of the mRRH1; element 3 in the second column of the second row in the above matrix B denotes that the UE2 is located in the third quadrant of the mRRH4; and element 2 in the third column of the third row in the above matrix B denotes that the UE3 is located in the second quadrant of the mRRH5.

If there are N directional antennas, the coverage area of the mRRH can be divided into N parts.

Next, the BBU determines the number of UEs in each quadrant based on the coverage relationship between the mRRHs and the UEs as determined in step 510 and the determined correspondence relationship between the UEs and the beam directions covered by the mRRHs, and further controls the directional antennas toward the quadrant to switch on or off based on a ratio between the number of UEs in each quadrant of each mRRH and the total number of UEs in the mRRH, and allocates a power to the directional antennas.

The above implementation manner for scenario 2 can be slightly changed so as to be applicable to scenario 1. In scenario 1 of the indoor wireless network, each mRRH is equipped with multiple antennas, and each antenna represents one RF channel to generate different beams in different directions.

Thus, in an implementation for scenario 1, the BBU generates a beam weight factor for each beam based on the location distribution of the UE1-UE9, and uses the generated beam weight factor to weight a corresponding beam and performs a power allocation for each antenna of each mRRH based on weighted beams.

Here, performing a power allocation for each mRRH includes: using the above beam relationship to determine where the power should be increased so as to dynamically assign weights to generate different beam patterns by using some power allocation schemes according to the distribution of the users, or to select suitable beam patterns from some predefined beam patterns (element subsets, weights, etc.).

Through the above steps 510-540, the power allocation for mRRHs in the indoor wireless network is implemented. However, considering the characteristics of mutual interference between the UEs, some UE groups may still not meet the intra-cell frequency reuse requirement, and thus the process of power re-coordination between the UEs (step 550) is further introduced so that the group of mutually interfered UEs look like a group of fully isolated UEs.

As shown in the left side of FIG. 4, UE1, UE2 and UE3 are distributed in mRRH1, mRRH4 and mRRH5, respectively. Because these UEs are in adjoining rooms, there are much mutual interferences between them, and so they use different frequency resources. Some persons aggregate in some areas of room A1 (as shown in the right side of FIG. 4), so the directional antenna in this angle is allocated with larger power. The interference of mRRH1 to UE2 and UE3 should be reduced. Beam directions in rooms B1 and B2 are for UE2 and UE3, respectively. So the interference of mRRH4 and mRRH5 to UE1 is reduced correspondingly. From this point of view, the mutual interference between UE1, UE2 and UE3 is reduced. If the interference is lower than the frequency reuse threshold, frequency reuse has already been realized after the power allocation according to the UE distribution. Otherwise, the power of the directional antennas should be slightly reallocated to realize the frequency reuse.

Figure 7:
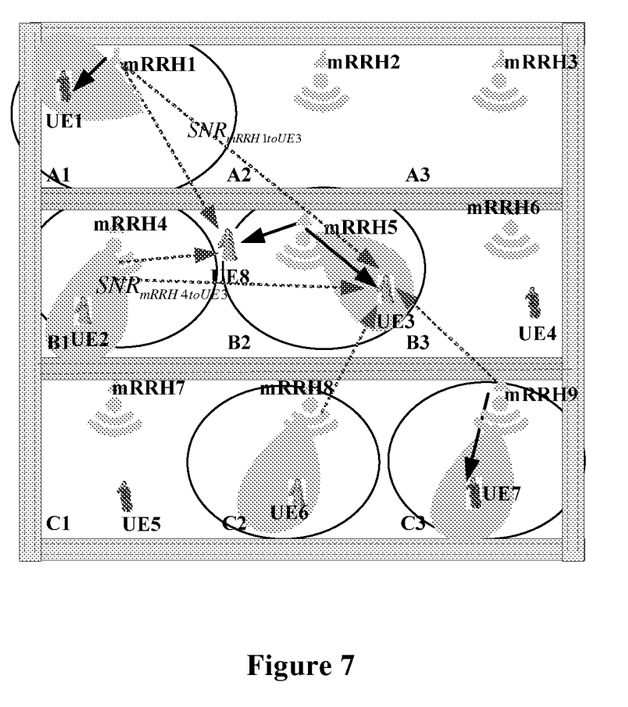
FIG. 7 shows a schematic diagram of the interference of other mRRHs to a UE in one embodiment of the present disclosure.

FIG. 7 shows a schematic diagram of the interference of other mRRHs to the UEs in one embodiment of the present disclosure. In FIG. 7, for example, as shown by the dotted line, the dotted line from mRRH1 to UE3 indicates the interference of mRRH1 to UE3, i.e. $SNR_{mRRH1\,toUE3}$.

In step 550, firstly, the BBU determines a difference between the SNR of one UE (e.g. UEm) in each mRRH and the SNR of another UE (e.g. UEn) in the indoor wireless network 400. For example, the difference ($rSNR_{UE\_m\&UE\_n}$) may be denoted as:

$$rSNR_{UE\_m\&UE\_n} = SNR_{UE\_mtoUE\_m} - SNR_{UE\_mtoUE\_n}, \quad (1)$$

where $SNR_{mRRH\_mtoUE\_m}$ denotes the Signal Noise Ratio (SNR) of a signal received by UEm from mRRHm; $SNR_{mRRH\_mtoUE\_n}$ denotes the Signal Noise Ratio (SNR) of a signal received by UEn from mRRHm. Similarly, m=1, 2, . . . , l, n=1, 2, . . . , k, wherein k and l are respectively the number of UEs and the number of mRRHs contained in the indoor wireless network 400.

If the difference $rSNR_{UE\_m\&UE\_n}$ is greater than a predetermined frequency reuse threshold, then it is determined that the intra-cell frequency reuse can be implemented for UEm and UEn.

On the contrary, if the difference $rSNR_{UE\_m\&UE\_n}$ is less than or equal to the predetermined frequency reuse threshold, then a power re-coordination factor between UEm and UEn can be determined based on the difference $rSNR_{UE\_m\&UE\_n}$ and a predetermined isolation threshold of the indoor wireless network 400 so as to adjust a transmit power of the UEm and/or UEn.

For example, the power re-coordination factor can be calculated as below:

$$P_{m\&n} = SNR_{Isolated-threshold} - rSNR_{UE\_m\&UE\_n} \quad (2)$$

where $P_{m\&n}$ is the power re-coordination factor between UEm and UEn, and $SNR_{Isolated-threshold}$ is the predetermined isolation threshold. Thereby, the BBU can adjust the transmit power of the antenna where UEm or UEn is located. Certainly, the precondition for the adjustment is that there will be no influence on the basic coverage and there will be no large influence on the adjusted group of UEs.

If the frequency reuse gain in the mutually interfered group is lower than current resource allocation, the power re-coordination is not necessary.

Taking FIG. 7 as an example, after step 540, UE1, UE2 and UE3 build the UE pair, where the intra-cell frequency reuse solution can be used. But there is still some interference between UE1 and UE8, UE2 and UE8. According to the formula (2), the power re-coordination factor can be obtained, and thus the BBU can reduce the resource block power of UE1 in mRRH1 to meet the full isolation condition between UE1 and UE8, or can reduce the resource block power of UE8 in mRRH5 to realize the intra-cell frequency reuse between UE1 and UE8. The procedure for UE2 and UE8 is the same as that for UE1 and UE8.

Figure 8:
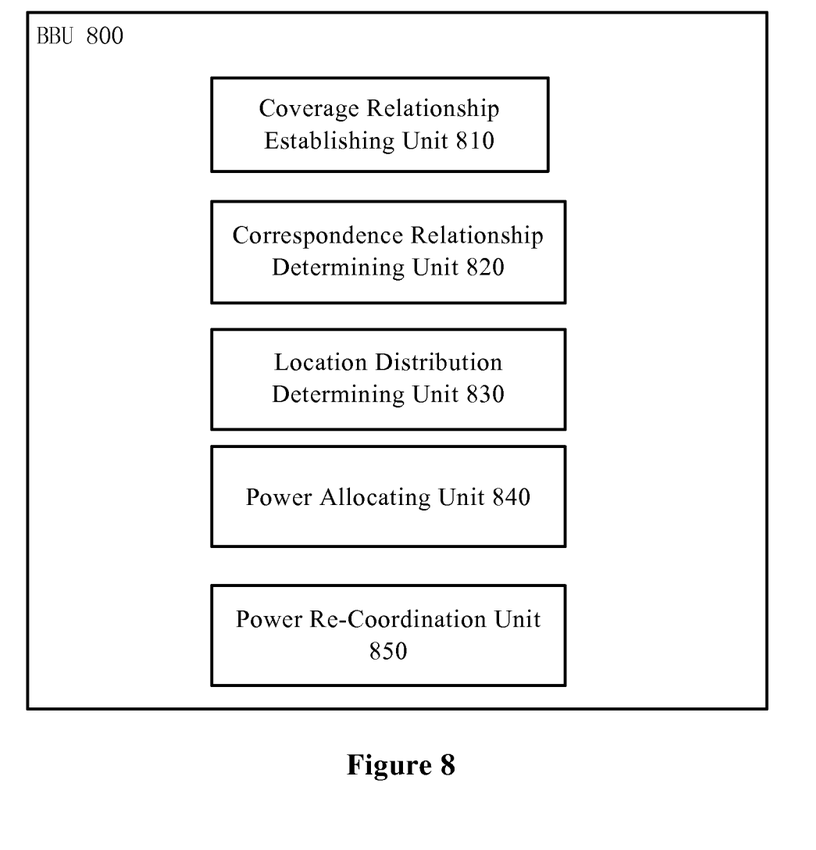
FIG. 8 shows a schematic diagram of a Base Band Unit (BBU) for intra-cell frequency reuse in an indoor wireless network according to embodiments of the present disclosure.

FIG. 8 shows a schematic diagram of a Base Band Unit (BBU) 800 for intra-cell frequency reuse in an indoor wireless network according to embodiments of the present disclosure. The BBU 800 is described below in combination with the indoor wireless network 400.

As shown in FIG. 8, the BBU 800 includes: a coverage relationship establishing unit 810 configured to establish a coverage relationship between mRRH1-mRRH9 and UE1-UE9 in the indoor wireless network 400; a correspondence relationship determining unit 820 configured to determine a correspondence relationship between the UEs and beam directions covered by each mRRH in the indoor wireless network 400; a location distribution determining unit 830 configured to determine a location distribution of UE1-UE9 based on the coverage relationship determined by the coverage relationship establishing unit 810 and the correspondence relationship determined by the correspondence relationship determining unit 820; and a power allocating unit 840 configured to perform a power allocation for each mRRH based on the location distribution of UE1-UE9.

In one preferred implementation, the coverage relationship establishing unit 810 further includes a unit configured to capture an uplink signal of each mRRH and analyze an uplink SINR of each UE; a unit configured to compare the uplink SINR of each UE with a preset SNR threshold; and a unit configured to determine that the UE is covered by the mRRH when the uplink SINR is greater than the SNR threshold.

In one preferred implementation, the coverage relationship is denoted as:

$$C = \begin{bmatrix} c_{11} & c_{12} & \cdots & c_{1l} \\ c_{21} & & & \\ & & c_{ij} & \\ c_{k1} & c_{k2} & \cdots & c_{kl} \end{bmatrix}$$

where $c_{ij}$ denotes whether the ith UE of the indoor wireless network 400 is located in a coverage area of the jth mRRH or is adjacent to the jth mRRH, i=1, 2, . . . , k, j=1, 2, . . . , l; k and l are respectively the number of UEs and the number of mRRHs contained in the indoor wireless network 400.

In one preferred implementation, in the indoor wireless network 400, each mRRH is equipped with an RF channel that connects multiple directional antennas; each mRRH further includes a switch unit to switch on/off the multiple directional antennas. In such an implementation, the correspondence relationship determining unit 820 further includes a unit configured to divide a coverage area of each mRRH into multiple quadrants based on the number of directional antennas corresponding to each mRRH so as to determine quadrant of the mRRH in which each UE is located; the location distribution determining unit 830 further includes a unit configured to determine the number of UEs in each quadrant; and the power allocating unit 840 further includes a unit configured to control, based on a ratio between the number of UEs in each quadrant of each mRRH and the total number of UEs in the mRRH, the directional antenna toward the quadrant to switch on or off and to allocate a power to the directional antenna.

In one preferred implementation, in the indoor wireless network 400, each mRRH is equipped with multiple antennas, and each antenna represents one RF channel to generate different beams in different directions. In such an implementation, the BBU 800 further includes a unit configured to generate a beam weight factor for each beam based on the location distribution of UE1-UE9, and the power allocating unit 840 further includes a unit configured to use the beam weight factor to weight a corresponding beam and to perform a power allocation for each antenna of each mRRH based on weighted beams.

In one preferred implementation, the BBU 800 further includes a power re-coordination unit 850 that is configured to determine a difference between a SNR of one UE in each mRRH and a SNR of another UE in the indoor wireless network 400, to determine that the one UE and the another UE can perform the intra-cell frequency reuse if the difference is greater than a predetermined frequency reuse threshold, and to determine a power re-coordination factor between the one UE and the another UE based on the difference and a predetermined isolation threshold of the indoor wireless network 400 if the difference is less than or equal to the predetermined frequency reuse threshold, so as to adjust a transmit power of the one UE and/or the another UE.

The present disclosure provides a method to improve the capacity and spectrum efficiency of the indoor wireless system, and it realizes intra-cell frequency reuse between a group of mutually interfered UEs by the power allocation and re-coordination between UE group serving directional antennas, and thereby can easily realize the frequency reuse. The solution of the present disclosure can dynamically find out all UEs that can perform the intra-cell frequency reuse, and the solution keeps compatible with existing protocols and is very easy to be implemented in the existing wireless network. Unlike MU-MIMO and CoMP, this solution does not need complexity pre-coding technologies and will not introduce an extra overhead for a channel feedback. In addition, this solution can implement centralized scheduling and will not introduce a frequent handover.

Compared with existing solutions, the present disclosure has the following advantages:

1. It is not necessary to split a cell into several sub-cells (sectors) for frequency reuse. In this solution, the cell works as one whole and implements frequency reuse among UEs. So, this solution has a low cost, especially in the deployment aspect.

2. Its full centralized scheduling can obtain a high frequency spectrum efficiency and it will not introduce a frequent handover.

3. This solution is compatible with existing protocols and does not need complexity pre-coding technologies.

4. This solution expands the old frequency reuse range and increases the cell capacity obviously.

In one or more exemplary designs, the functions of the present application may be implemented using hardware, software, firmware, or their arbitrary combinations. In the case of implementation with software, the functions may be stored on a computer readable medium as one or more instructions or codes, or transmitted as one or more instructions or codes on the computer readable medium. The computer readable medium includes a computer storage medium and a communication medium, wherein the communication medium includes any medium that helps to transmit the computer program from one place to another place. The storage medium may be any available medium accessible to a generic or a dedicated computer. The computer-readable medium may include, for example, but not limited to, RAM, ROM, EEPROM, CD-ROM or other optical disk storage device, a magnetic disk storage device, or other magnetic storage device, or any other medium that carries or stores a desired program code module in a form of instruction or data structure that is accessible to a generic or dedicated computer or a generic or dedicated processor. Besides, any connection may also be called a computer-readable medium. For example, if software is transmitted from a website, server or other remote source using a co-axial cable, an optical cable, a twisted pair wire, a digital subscriber line (DSL), or a radio technology such as infra-red, radio or microwave, then the co-axial cable, optical cable, twisted pair wire, DSL, or radio technology such as infrared, radio or microwave are also covered in the definition of medium.

A general-purpose processor, digital signal processor (DSP), application-specific integrated circuit (ASIC), field programmable gate array (FPGA) or other programmable logical device, discrete gate or transistor logic, discrete hardware component or any combination of the above for performing the functions as described herein can be used to implement or execute various exemplary logic blocks, modules and circuits as described in conjunction with the present disclosure. The general-purpose processor may be a microprocessor, or the processor may also be any conventional processor, controller, microcontroller, or a state machine. The processor may be implemented as a combination of computing devices, e.g., combination of DSP and microprocessor, a plurality of microprocessors, a combination of one or more microprocessors with a DSP kernel, or any other such structure.

A person with normal skills in the art should also understand that various logical blocks, modules, circuits and algorithm steps as exemplarily depicted in conjunction with the embodiments of the present application may be implemented as electronic hardware, computer software, or a combination of both. In order to clearly express such interchangeability between hardware and software, the various exemplary components, blocks, modules, circuits and steps have been depicted in general with regard to the functions. As to whether the functions are implemented in hardware or software, it depends on a specific application and a design constraint condition applied on the whole system. Those skilled in the art may implement the depicted functions in a flexible manner for each specific application. However, such an implementation decision should not be construed as departing from the protection scope of the present disclosure.

The above depiction of the present disclosure is intended to enable any person of normal skills in the art to implement or use the present disclosure. For a person of normal skills in the art, various modifications of the present disclosure are obvious, and the general principle as defined herein may also be applied to other variants without departing from the spirit and protection scope of the present disclosure. Thus, the present disclosure is not limited to the instances and designs as described herein, but consistent with the broadest scope of the principle and novel characteristics of the present disclosure.

The invention claimed is:

1. A method for intra-cell frequency reuse for an indoor wireless network, wherein the indoor wireless network comprises a Base Band Unit (BBU), one or more micro power Remote Radio Heads (mRRHs) and radio hubs connecting the BBU and the mRRHs; the indoor wireless network belongs to a same cell that serves multiple User Equipments (UEs), the method comprising at the BBU:
   establishing a coverage relationship between the one or more mRRHs and the multiple UEs;
   determining a correspondence relationship between the UEs and beam directions covered by each mRRH of the one or more mRRHs;
   determining a location distribution of the multiple UEs based on the coverage relationship between the mRRHs and the UEs and the correspondence relationship between the UEs and the beam directions covered by the mRRH; and
   performing a power allocation for each mRRH based on the location distribution of the multiple UEs.

2. The method according to claim 1, wherein establishing a coverage relationship between the one or more mRRHs and the multiple UEs comprises:
   capturing an uplink signal of each mRRH and analyzing an uplink Signal to Interference plus Noise Ratio (SINR) of each UE;
   comparing the uplink SINR of each UE with a preset Signal Noise Ratio (SNR) threshold; and
   determining that the UE is covered by the mRRH when the uplink SINR is greater than the SNR threshold.

3. The method according to claim 2, wherein the coverage relationship is denoted as:

$$C = \begin{bmatrix} c_{11} & c_{12} & \ldots & c_{1l} \\ c_{21} & & & \\ & & c_{ij} & \\ c_{k1} & c_{k2} & \ldots & c_{kl} \end{bmatrix},$$

where $c_{ij}$ denotes whether the ith UE of the indoor wireless network is located in a coverage area of the jth mRRH or is adjacent to the jth mRRH, i=1, 2, . . . , k, j=1, 2, . . . , l; k and l are respectively the number of UEs and the number of mRRHs contained in the indoor wireless network.

4. The method according to claim 1, wherein each mRRH is equipped with one Radio Frequency (RF) channel that connects multiple directional antennas; the mRRH further comprises a switch unit to switch on/off the multiple directional antennas, wherein
   determining a correspondence relationship between UEs and beam directions covered by each mRRH of the one or more mRRHs comprises: dividing a coverage area of each mRRH into multiple quadrants based on the number of directional antennas corresponding to each mRRH so as to determine quadrant of the mRRH in which each UE is located;
   determining a location distribution of the multiple UEs comprises: determining the number of UEs in each quadrant; and performing a power allocation for each mRRH comprises:
based on a ratio between the number of UEs in each quadrant of each mRRH and the total number of UEs in the mRRH, controlling the directional antenna toward the quadrant to switch on or off and allocating a power to the directional antenna.

5. The method according to claim 1, wherein each mRRH is equipped with multiple antennas, and each antenna represents one Radio Frequency (RF) channel to generate different beams in different directions, and wherein the method further comprises:
generating a beam weight factor for each beam based on the location distribution of the multiple UEs, and
performing a power allocation for each mRRH based on the location distribution of the multiple UEs comprises:
using the beam weight factor to weight a corresponding beam and performing a power allocation for each antenna of each mRRH based on weighted beams.

6. The method according to claim 1, further comprising:
determining a difference between an SNR of one UE in each mRRH and an SNR of another UE in the indoor wireless network;
determining that the one UE and the another UE can perform the intra-cell frequency reuse if the difference is greater than a predetermined frequency reuse threshold; and
determining a power re-coordination factor between the one UE and the another UE based on the difference and a predetermined isolation threshold of the indoor wireless network if the difference is less than or equal to the predetermined frequency reuse threshold, so as to adjust a transmit power of the one UE and/or the another UE.

7. A Base Band Unit (BBU) for intra-cell frequency reuse for an indoor wireless network, wherein the indoor wireless network comprises the BBU, one or more micro power Remote Radio Heads (mRRHs) and radio hubs connecting the BBU and the mRRHs; the indoor wireless network belongs to a same cell that serves multiple User Equipments (UEs), the BBU comprising one or more processors configured to:
establish a coverage relationship between the one or more mRRHs and the multiple UEs;
determine a correspondence relationship between UEs and beam directions covered by each mRRH of the one or more mRRHs;
determine a location distribution of the multiple UEs based on the coverage relationship between the mRRHs and the UEs and the correspondence relationship between the UEs and the beam directions covered by the mRRH; and
perform a power allocation for each mRRH based on the location distribution of the multiple UEs.

8. The Base Band Unit (BBU) according to claim 7, wherein the one or more processors is further configured to capture an uplink signal of each mRRH and to analyze an uplink Signal to Interference plus Noise Ratio (SINR) of each UE; a unit configured to compare the uplink SINR of each UE with a preset Signal Noise Ratio (SNR) threshold; and a unit configured to determine that the UE is covered by the mRRH when the uplink SINR is greater than the SNR threshold.

9. The Base Band Unit (BBU) according to claim 8, wherein the coverage relationship is denoted as:

$$C = \begin{bmatrix} c_{11} & c_{12} & \ldots & c_{1l} \\ c_{21} & & & \\ & & c_{ij} & \\ c_{k1} & c_{k2} & \ldots & c_{kl} \end{bmatrix},$$

where $c_{ij}$ denotes whether the ith UE of the indoor wireless network is located in a coverage area of the jth mRRH or is adjacent to the jth mRRH, i=1, 2, ..., k, j=1, 2, ..., l; k and l are respectively the number of UEs and the number of mRRHs contained in the indoor wireless network.

10. The Base Band Unit (BBU) according to claim 7, wherein in the indoor wireless network, each mRRH is equipped with one Radio Frequency (RF) channel that connects multiple directional antennas; the mRRH further comprises a switch unit to switch on/off the multiple directional antennas, wherein
the one or more processors is further configured to:
divide a coverage area of each mRRH into multiple quadrants based on the number of directional antennas corresponding to each mRRH so as to determine quadrant of the mRRH in which each UE is located;
determine the number of UEs in each quadrant; and
control, based on a ratio between the number of UEs in each quadrant of each mRRH and the total number of UEs in the mRRH, the directional antenna toward the quadrant to switch on or off and to allocate a power to the directional antenna.

11. The Base Band Unit (BBU) according to claim 7, wherein in the indoor wireless network, each mRRH is equipped with multiple antennas, and each antenna represents one Radio Frequency (RF) channel to generate different beams in different directions, the one or more processors being further configured to:
generate a beam weight factor for each beam based on the location distribution of the multiple UEs, and
use the beam weight factor to weight a corresponding beam and to perform a power allocation for each antenna of each mRRH based on weighted beams.

12. The Base Band Unit (BBU) according to claim 7, wherein the one or more processors is further configured to:
determine a difference between an SNR of one UE in each mRRH and an SNR of another UE in the indoor wireless network;
determine that the one UE and the another UE can perform the intra-cell frequency reuse if the difference is greater than a predetermined frequency reuse threshold; and
determine a power re-coordination factor between the one UE and the another UE based on the difference and a predetermined isolation threshold of the indoor wireless network if the difference is less than or equal to the predetermined frequency reuse threshold, so as to adjust a transmit power of the one UE and/or the another UE.

* * * * *